United States Patent [19]

Melocik et al.

[11] Patent Number: 4,934,478

[45] Date of Patent: Jun. 19, 1990

[54] CONTACT SENSING APPARATUS AND METHOD

[75] Inventors: Grant C. Melocik, Chardon; John E. Wible, Painesville, both of Ohio

[73] Assignee: Caterpillar Industrial Inc., Mentor, Ohio

[21] Appl. No.: 827,851

[22] Filed: Feb. 10, 1986

[51] Int. Cl.⁵ .............................................. B60T 7/22
[52] U.S. Cl. ................................. 180/275; 180/277; 367/136; 181/140
[58] Field of Search ............... 180/274, 275, 277, 279; 280/734, 735; 340/51, 52 H, 540, 665; 367/135, 136; 181/0.5, 140; 310/319

[56] References Cited

U.S. PATENT DOCUMENTS

| | | | |
|---|---|---|---|
| 3,440,347 | 4/1969 | Spencer et al. | 367/135 |
| 3,901,346 | 8/1975 | Kohls et al. | 180/96 |
| 4,297,684 | 10/1981 | Butter | 367/136 |
| 4,346,914 | 8/1982 | Livers et al. | 180/274 |
| 4,363,376 | 12/1982 | Sjöberg et al. | 180/275 |

FOREIGN PATENT DOCUMENTS 72441  5/1980  Japan ................................. 180/274

*Primary Examiner*—Charles A. Marmor
*Assistant Examiner*—Karin Tyson
*Attorney, Agent, or Firm*—Stephen L. Noe

[57] ABSTRACT

A sensing apparatus capable of delivering a control signal in response to contact between an element of the apparatus and an external object should respond readily to a predetermined level of contact, and should be sensitive along all portions of the contact sensing surface. The instant invention provides a contact sensing apparatus including a conduit having a generally hollow tubular construction and being formed from a resilient deformable material. A sonic generator is connected to one end of the conduit and a sonic detector is connected to the other end of the conduit. An electrical circuit is connected to the sonic generator and sonic detector, and is adapted to controllably produce a control signal in response to contact between the conduit and an external object. The instant invention is advantageously free from electro-mechanical switches and optical devices likely to be contaminated when used in an industrial environment, and requires no seals or other precautions necessary to contain pressure or fluid within the conduit.

5 Claims, 2 Drawing Sheets

CONTACT SENSING APPARATUS AND METHOD

TECHNICAL FIELD

This invention relates generally to an apparatus and method for sensing contact between an element of an apparatus and an external object, and, more particularly, to an apparatus and method utilizing an acoustical signal to produce a control signal in response to contact between an element of a sensing apparatus and an external object.

BACKGROUND ART

Many types of sensing devices for producing a signal in response to contact between a sensing apparatus and an external object are available commercially today. For example, a simple push button switch can be considered a form of contact sensing device. However, it is often necessary to sense contact over an extended surface portion of a device, rather than at a single point as made possible by a simple switch. In such cases, more elaborate sensing devices and/or mechanical linkages are required.

An example of such a requirement is the need for contact sensing on the exterior portion of an automatic guided vehicle. Such vehicles, currently in use in industrial and commercial environments, are typically guided by wires, radio signals, or other navigation methods about a closed environment without operator assistance or control. It is necessary that such vehicles reduce speed or stop upon intentional or accidental contact with people or objects encountered in the path of the vehicle.

Such automatic vehicles often have multiple needs for contact sensing devices. For example, sensing devices are commonly provided at various points around the periphery of a vehicle to allow personnel in the area of the vehicle to momentarily stop it at non-programmed points in the travel path. In addition, bumper systems are generally provided on such vehicles to detect unintentional contact with personnel or objects, and to responsively stop the vehicle. In each case, it is desirable to provide the utmost flexibility in the contact sensing arrangement, such that it is not necessary to contact the vehicle in a small particularized location, but rather to provide an extended contact area over which sensing can occur.

Other uses for contact sensing devices can be readily envisioned. For example, industrial machine tools often require contact sensing mechanisms around particular operational areas. Security systems also make use of extended area contact sensing devices.

One device especially designed for use on the bumper of a driverless vehicle is disclosed in U.S. Pat. Ser. No. 3,901,346, issued Aug. 26, 1975, to James P. Kohls. Kohls teaches the use of a bumper member having a resilient tube mounted on the outer periphery thereof and engageable with an obstacle. The tube is in fluid communication with a pressure switch, which is operated upon an increase in pressure caused by contact with and subsequent collapse of the resilient tube. Energization of the pressure switch in turn operates a stopping control on the vehicle. Other existing systems include pseudo-contact devices such as optical gates or fences produced with various optical components, generally including mirrors or prisms.

Each of the known prior systems poses particular problems in use. As noted, the mechanical switch type systems require mechanical linkages to extend the contact area over a peripheral portion of the element carrying the sensing device. In addition, mechanical switches are notoriously prone to contamination from various elements in the environment, and require elaborate sealing procedures in order to remain operational. Optical devices require precise alignment to ensure that the projected optical beam remains on target, and are susceptible to smoke and other atmospheric contaminants as well. The Kohls device requires that a pressurized medium be maintained in the resilient tube. Consequently, the vehicle must carry a fluid or air pump at all times. In addition, leaks in the pressurized system are not only possible but likely after some use in an industrial environment. In particular, where the resilient tube is utilized on a bumper of a vehicle it is subject to impact damage, producing such leaks.

The present invention is directed to overcoming one or more of the problems as set forth above.

DISCLOSURE OF THE INVENTION

In one aspect of the present invention, a contact sensing apparatus for producing a control signal in response to contact between an element of the sensing apparatus and an external object is provided. The apparatus includes an acoustical or sonic generator and a corresponding acoustical or sonic detector. The generator produces an acoustical signal which can be received by the detector, which in turn produces a responsive electrical signal. A deformable conduit controllably conducts the acoustical signal from the generator to the detector. An electrical circuit receives the electrical signal from the detector and produces a control signal in response to the electrical signal having at least a predetermined magnitude.

In a second aspect of the present invention, a method for producing a control signal in response to contact between an element of a sensing apparatus and an external object is provided. The method includes the steps of producing an acoustical signal, controllably passing the acoustical signal through a hollow deformable conduit, and receiving the acoustical signal passed through the conduit. An electrical signal is produced having a magnitude responsive to the intensity of the received acoustical signal, and a control signal is produced in response to the electrical signal having at least a predetermined magnitude.

The present invention provides a contact sensing apparatus and method that can be used to sense contact over an extended surface area of the object to which it is applied. The sensing apparatus is free from elements such as electro-mechanical switches, optical devices, and pressurized units that are particularly susceptible to damage.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
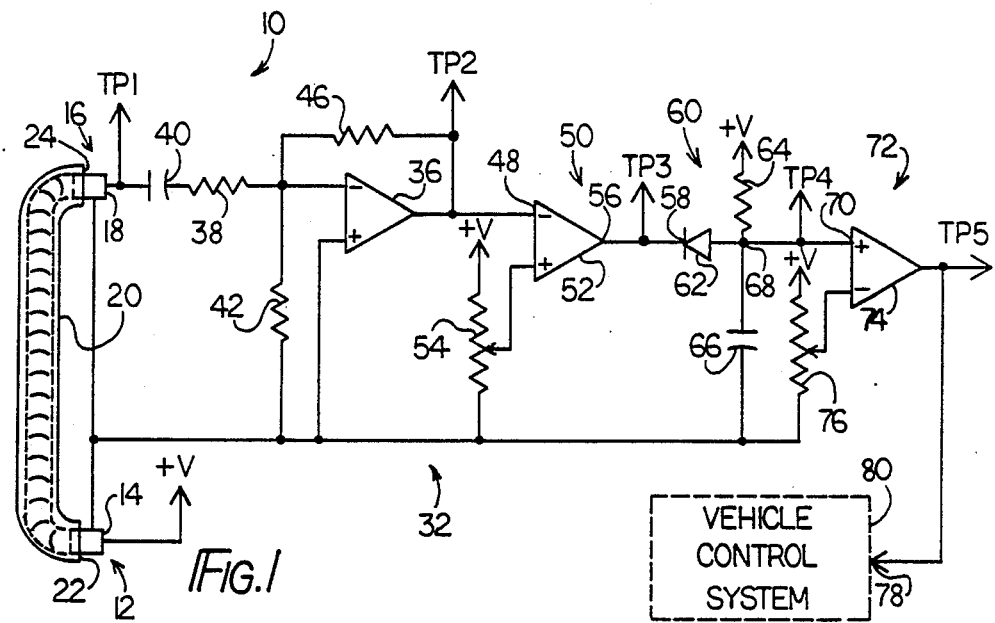
FIG. 1 is a schematic representation of electrical circuitry suitable for use with the present invention.
Figure 2:
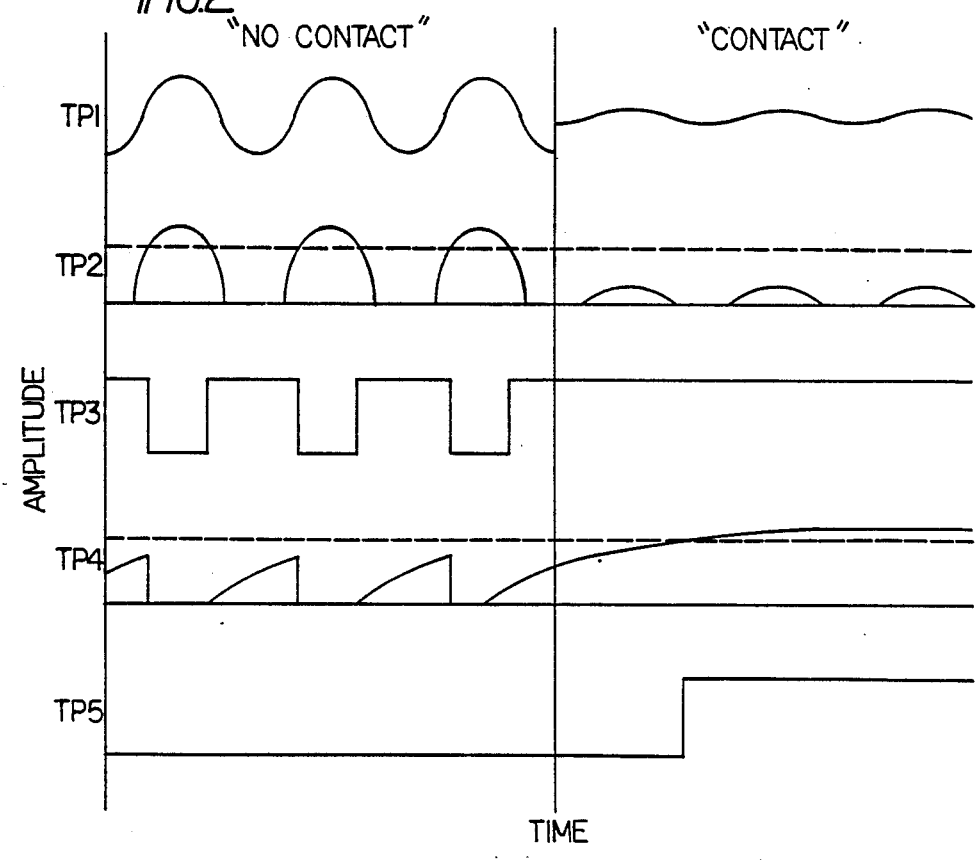
FIG. 2 illustrates a number of representative waveforms associated with the schematic representation of FIG. 1.

Referring first to FIG. 1 and to the associated waveforms in FIG. 2, an apparatus embodying certain of the principles of the present invention is generally indicated by the reference numeral 10. It should be understood that the following detailed description relates to the best presently known embodiment of the apparatus 10. However, the apparatus 10 can assume numerous other embodiments, as will become apparent to those skilled in the art, without departing from the appended claims.

The apparatus 10 includes generator means 12 for producing an acoustical signal. The generator means 12 is, for example, a sonic generator 14 of the type manufactured by Murata-Erie as Model No. PKB5-3B0, and is connected to a source of electrical power and to circuit ground.

A detector means 16 receives the acoustical signal produced by the generator means 12 and produces an electrical signal having a magnitude responsive to the intensity of the received acoustical signal. The detector means 16 is, for example, a sonic detector 18. The sonic detector 18 is, in the preferred embodiment, a simple microphone type transducer.

A conduit means 20 controllably conducts the acoustical signal from the generator means 12 to the detector means 16. The sonic generator 14 is connected to one of a first and second end 22,24 of the conduit means 20 and the sonic detector 18 is connected to the other of the first and second ends 22,24 of the conduit means 20.

Figure 3:
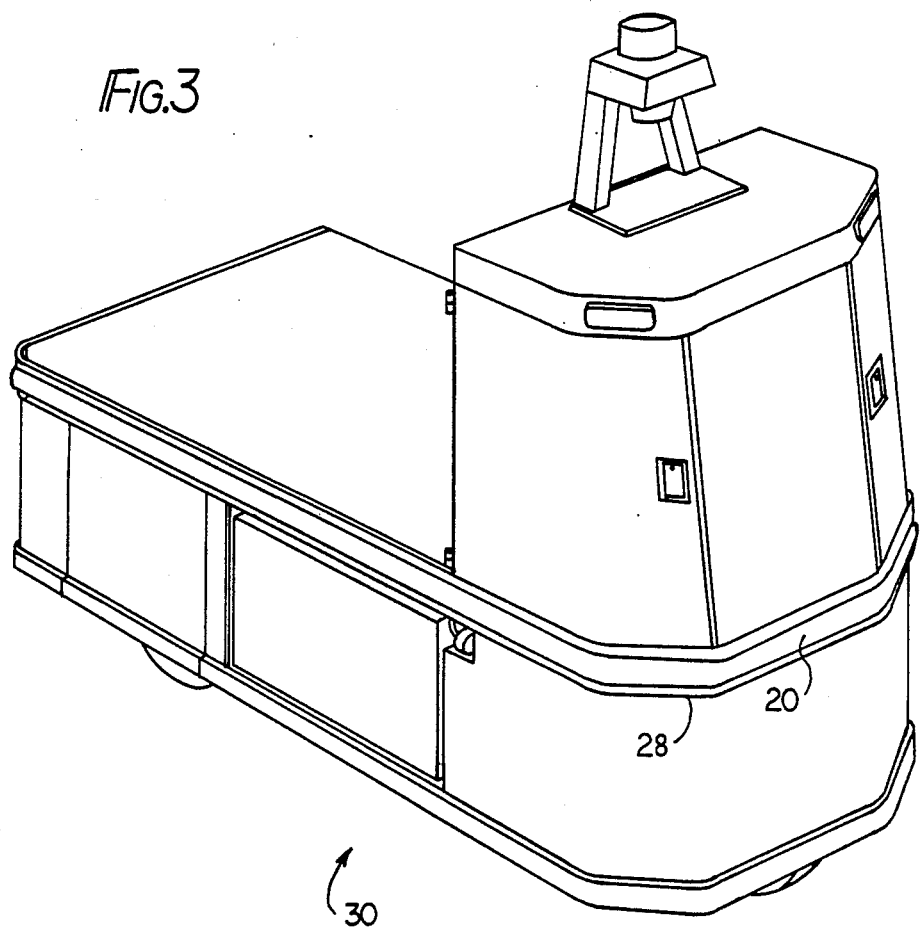
FIG. 3 is a pictorial view of a vehicle incorporating an embodiment of the present invention.
Figure 4:
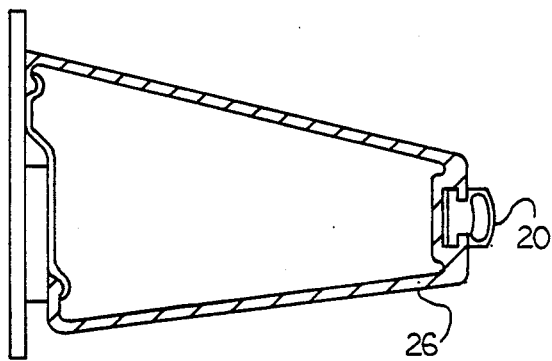
FIG. 4 is a sectional view of a vehicle bumper incorporating elements of the present invention.
Figure 5:
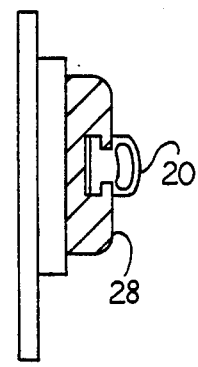
FIG. 5 is a sectional view of an alternative method of mounting an element of the present invention.

Referring temporarily to FIGS. 3, 4, and 5, the conduit means 20 is preferably of a generally hollow tubular construction and is formed from a resilient deformable material. FIGS. 4 and 5 show a cross-sectional view of a preferred embodiment of the conduit means 20 in two different mounting configurations. In FIG. 4, the conduit means 20 is attached to a generally resilient bumper element 26, while in FIG. 5 the conduit means 20 is attached to a solid rail element 28. In both cases, a preferred method of attaching the conduit means 20 to the bumper 26 or rail 28 is by use of a "T" shaped attaching portion slidably engaged with the bumper 26 or rail 28. This construction is readily accomplished in an extrusion-type process utilizing polymer materials. FIG. 3 shows the general construction of FIG. 5 in place on a automatic guided vehicle 30. The rail 28 and conduit means 20 extend generally horizontally circumferentially around a peripheral portion of the vehicle 30. It can readily be appreciated that the construction shown in FIG. 4 can be applied to the vehicle 30, thus providing a bumper 26 carrying the conduit means 20 and located as desired on the vehicle 30. Likewise, other configurations and mounting methods for the conduit means 20 can be readily concepted by those skilled in the art, and applications of the conduit means 20 to devices other than the vehicle 30 can also be appreciated.

Adverting now to FIG. 1, a circuit means 32 for receiving an electrical signal and producing a control signal in response to the electrical signal having at least a predetermined magnitude is indicated. The circuit means 32 includes an amplifier 36 having an input terminal connected through a series resistor 38 and capacitor 40 to the sonic detector 18. The amplifier 36 is also connected through a biasing resistor 42 to circuit ground and includes a feedback resistor 46.

An output terminal of the amplifier 36 is connected to an input terminal 48 of a first comparator circuit 50. The first comparator circuit 50 includes an amplifier 52 and a first reference determining potentiometer 54.

An output terminal 56 of the first comparator circuit 50 is connected to an input terminal 58 of an integrator circuit 60. The integrator circuit 60 includes a diode 62 connected to the junction of a resistor 64 and capacitor 66.

The junction of the resistor 64 and capacitor 66 forms an output terminal 68 of the integrator circuit 60, and is connected to an input terminal 70 of a second comparator circuit 72. The second comparator circuit 72 includes an amplifier 74 and a second reference determining potentiometer 76.

In the preferred embodiment, an output terminal 78 of the second comparator circuit 72 is connected to a vehicle control system 80. The vehicle control system 80 is of conventional design, and includes provision for stopping the vehicle 30 upon receipt of a predetermined control signal. Alternatively, the control signal delivered from the circuit means 32 can be passed to the control system of a machine tool or other device associated with the apparatus 10. Other such uses and applications for the apparatus 10 will be readily apparent to those skilled in the art.

Industrial Applicability

Operation of the apparatus 10 is best described in relation to its use on a vehicle, for example, an automatic guided vehicle 30 such as that pictured in FIG. 3. The apparatus 10 can be incorporated on the vehicle 30 in the manner shown in FIG. 3, wherein the conduit means 20 extends generally horizontally circumferentially around a peripheral portion of the vehicle 30 and is available for use as an emergency stop switch, or it can be alternatively incorporated in cooperation with a bumper 26 of the type shown in FIG. 4, wherein the conduit means 20 is mounted on an outwardly facing surface portion of the bumper 26. In either case, contact between the conduit means 20 and a generally solid external object causes the conduit means 20 to deform, partially or entirely closing off the hollow tubular portion of the conduit means 20.

Referring to FIGS. 1 and 2, the generator means 12 continuously produces an acoustical signal which is delivered into one of a first and second end 22,24 of the conduit means 20. Owing to the generally hollow tubular configuration of the conduit means 20, the acoustical signal is carried through the conduit means 20 to the other of the first and second ends 22,24 where it is received by the detector means 16. The detector means 16 responsively produces an electrical signal having a magnitude responsive to the intensity of the received acoustical signal, as depicted in the left hand portion of the waveform shown at TP1.

Owing to the configuration of the amplifier 36, the electrical signal produced by the detector means 16 is passed through the capacitor 40 and resistor 38, and the positive going portion of the signal is amplified as seen at TP2. The amplified signal is delivered to the input terminal 48 of the first comparator circuit 50, and a responsive duty cycle signal is produced at TP3. The duty factor of the signal at TP3 is determined by the reference voltage produced according to the adjustment of the first reference potentiometer 54. So long as the peak value of the amplified electrical signal at TP2 exceeds the reference voltage produced by the first reference potentiometer 54, shown in dotted form at TP2, the duty cycle signal is produced.

The duty cycle signal is passed to the input terminal 58 of the integrator circuit 60, where the capacitor 66 is charged through the resistor 64 during the period of time that the duty cycle signal has a logic "high" value, and is discharged during the period of time that the duty cycle signal has a logic "low" value. The signal produced by the integrator circuit 60 and depicted at TP4, is delivered to the input terminal 70 of the second comparator circuit 72, where it is compared with the reference voltage signal produced by adjustment of the second reference potentiometer 76, shown in dotted form at TP4. Owing to the adjustment of the second reference potentiometer 76 and to the respective values of the resistor 64 and the capacitor 66, the amplitude of the waveform at TP4 never exceeds the value of the reference voltage signal from the second reference potentiometer 76 during a time when the conduit means 20 is not in contact with an external object. Therefore, the second comparator circuit 72 continuously delivers a logic "low" control signal at the output terminal 78, as seen at TP5.

Consequently, in response to the conduit means 20 failing to contact an external object and remaining in a generally open tubular configuration, the waveforms shown in the left half of FIG. 2 continue to be produced, and the logic "low" signal shown at TP5 continues to be delivered to the control system 80. In response to the conduit means 20 being deformed by contact with an external object, the acoustical signal delivered from the generator means 12 to the detector means 16 is unable to pass freely through the conduit means 40, and is reduced in amplitude or intensity. Responsively, the electrical signal produced by the detector means 16 and delivered to the amplifier 36 is likewise reduced in magnitude, as shown in the right half of the waveform at TP1.

In response, the amplifier 36 delivers an amplified electrical signal to the first comparator means 50 in which the peak value of the electrical signal is less than the value of the reference signal produced by the first reference potentiometer 54, as shown at TP2. Responsively, the first comparator means 50 stops producing the duty cycle signal at TP3, and instead delivers a continuous logic "high" signal to the integrator circuit 60, as shown in the right half of TP3.

Owing to the fact that the capacitor 66 can no longer discharge through the diode 58 because the duty cycle signal is no longer being produced at TP3, the capacitor 66 has sufficient time to charge to the full supply voltage through the resistor 64. In response to the magnitude of the capacitor voltage 66 exceeding the magnitude of the reference voltage delivered by the second reference potentiometer 76, the second comparator circuit 72 begins to produce a logic "high" control signal at the output terminal 78, shown at TP5. The logic "high" control signal is then delivered to the control system 80. In the example utilizing an automatic guided vehicle, the logic "high" control signal causes the vehicle 30 to stop by deenergizing the vehicle motors and applying the vehicle brakes (not shown). Those skilled in the art will recognize that the control signal delivered from the apparatus 10 can produce other functional results, and can be used other than on vehicles such as that described with respect to the preferred embodiment. Likewise, the particular elements and construction of the apparatus 10 can be varied without departing from the scope of the appended claims.

Other aspects, objects, advantages, and uses of this invention can be obtained from a study of the drawings, the disclosure, and the appended claims.

We claim:

1. A contact sensing apparatus for producing a control signal in response to contact between an element of said sensing apparatus and an external object, comprising:

generator means for producing an acoustical signal;

detector means for receiving said acoustical signal and producing an electrical signal having a magnitude responsive to the intensity of said received acoustical signal;

deformable hollow conduit means for controllably conducting said acoustical signal from said generator means to said detector means; and circuit means for receiving said electrical signal and producing a control signal in response to said electrical signal having at least a predetermined magnitude, wherein said circuit means includes a first comparator means for producing a duty cycle signal in response to said electrical signal magnitude exceeding a predetermined value, an integrator means for producing a trigger signal in response to said duty cycle signal, and a second comparator means for producing said control signal in response to said trigger signal exceeding a predetermined value.

2. A contact sensing apparatus for delivering a control signal to a control system of a vehicle in response to contact between an element of said sensing apparatus and an external object, comprising:

generator means for producing an acoustical signal;

detector means for receiving said acoustical signal and producing an electrical signal having a magnitude responsive to the intensity of said received acoustical signal;

deformable hollow conduit means for controllably conducting said acoustical signal from said generator means to said detector means, said conduit means being positioned along an exterior portion of said vehicle; and circuit means for receiving said electrical signal, producing a control signal in response to said electrical signal having at least a predetermined magnitude and delivering said control signal to said vehicle control system to controllably stop said vehicle in response to receiving said control signal, wherein said circuit means includes a first comparator means for producing a duty cycle signal in response to said electrical signal magnitude exceeding a predetermined value, an integrator means for producing a trigger signal in response to said duty cycle signal, and a second comparator means for producing said control signal in response to said trigger signal exceeding a predetermined value.

3. A contact sensing apparatus, as set forth in claim 2, wherein said conduit means extends generally horizontally circumferentially around a peripheral portion of said vehicle.

4. A contact sensing apparatus, as set forth in claim 2, wherein said vehicle includes a bumper, and said conduit means is mounted on an outwardly facing surface portion of said bumper.

5. A contact sensing apparatus for delivering a control signal to a control system of a vehicle in response to contact between an element of said sensing apparatus and an external object, comprising:
- a conduit having first and second ends and being positioned along an exterior portion of said vehicle, said conduit being of a generally hollow tubular construction and being formed from a resilient deformable material;
- a sonic generator connected to one of said first and second ends of said conduit;
- a sonic detector connected to the other of said first and second ends of said conduit; and
- an electrical circuit connected to said sonic generator and said sonic detector, and adapted to controllably produce said control signal wherein said electrical circuit includes a first comparator circuit having an output terminal, and an input terminal connected to said sonic detector;
- an integrator circuit having an output terminal, and an input terminal connected to said first comparator output terminal; and
- a second comparator circuit having an input terminal connected to said integrator circuit output terminal, and an output terminal connected to said vehicle control system.

* * * * *